United States Patent [19]

Pearson

[11] Patent Number: 5,108,637

[45] Date of Patent: Apr. 28, 1992

[54] THREE-COMPONENT REFRIGERANT

[75] Inventor: Stephen F. Pearson, Glasgow, Great Britain

[73] Assignee: Star Refrigeration Ltd., Scotland, Scotland

[21] Appl. No.: 573,333

[22] Filed: Aug. 24, 1990

[30] Foreign Application Priority Data

Sep. 12, 1989 [GB] United Kingdom ............... 8920634
Jan. 18, 1990 [GB] United Kingdom ............... 9001149

[51] Int. Cl.$^5$ .............................................. C09K 5/04
[52] U.S. Cl. .................................... 252/67; 62/114
[58] Field of Search ........................ 252/67; 62/114

[56] References Cited

U.S. PATENT DOCUMENTS 4,482,465 11/1984 Gray ............................... 252/67
4,810,403 3/1989 Bivens et al. ................... 252/67
4,943,388 7/1990 Shankland et al. ............. 252/67

FOREIGN PATENT DOCUMENTS 54-37328 11/1979 Japan.
63-105088 5/1988 Japan.

OTHER PUBLICATIONS

Industrial Solvents Handbook, 2nd Edition, 1977.

*Primary Examiner*—Paul Lieberman
*Assistant Examiner*—Christine A. Skane
*Attorney, Agent, or Firm*—Krass & Young

[57] ABSTRACT

A three component refrigerant composition for use in vapor compression refrigerators and avoiding the use of ozone-depleting chlorofluorocarbons comprises a three component mixture of:

(i) a major portion comprised of chlorodifluoromethane (R22) of pentafluoroethane (R125);
(ii) R125 or octafluoropropane (R218); and
(iii) propane in non-flammable proportions.

4 Claims, 8 Drawing Sheets

GRAPHICAL REPRESENTATION OF ICE-MAKER PERFORMANCE FOR DIFFERENT MIXTURES OF R22, R290 and R218

PLAN VIEW

GRAPHICAL REPRESENTATION OF ICE-MAKER PERFORMANCE FOR DIFFERENT MIXTURES OF R22, R290 and R218

PLAN VIEW

GRAPHICAL REPRESENTATION OF DISCHARGE TEMPERATURE FOR DIFFERENT MIXTURES OF R22, R290 and R218

FIG-4B

PLAN VIEW

PLAN VIEW

GRAPHICAL REPRESENTATION OF WINDING TEMPERATURE FOR DIFFERENT MIXTURES OF R22, R290 and R218

FIG-7

MAP OF WINDING TEMP. CONTOURS FOR TERNARY REFRIGERANT MIXTURES

FIG-8

THREE-COMPONENT REFRIGERANT

The present invention relates to a three-component refrigerant mixture for use in refrigeration apparatus which has improved environmental acceptability.

In refrigeration apparatus, two commonly used refrigerants have been the chlorofluorocarbon gases (CFC) referred to as refrigerant 12 ($CCl_2F_2$) and refrigerant 502 (an azeotrope of R115 ($CClF_2CF_3$) and R22 ($CHClF_2$)). However, refrigerants 12 and 502 have been implicated in causing environmental damage. Specifically, these gases, which are very inert, are released from refrigeration systems, aerosols, foam packaging etc. at ground level and diffuse into the upper atmosphere. Because of their inertness, the gases are able to survive without decomposition until they reach the stratosphere where they are broken down by ultra-violet radiation, releasing chlorine atoms which catalyse breakdown of the stratospheric ozone layer. There has recently been considerable concern about reductions in stratospheric ozone levels and this has led to proposed bans on certain CFC'S such as refrigerants 11 and 12. Other refrigerants such as refrigerant 22 ($CHClF_2$) and refrigerant 125 ($CHF_2CF_3$) are environmentally less objectionable as they tend to be naturally degraded at lower levels of the atmosphere before reaching the ozone layer.

Considerable efforts are being made to replace refrigerants 12 and 502 with more environmentally acceptable alternatives. However, such new chemicals are generally unavailable at present and are expected to be considerably more expensive than presently used refrigerants.

Whilst refrigerant 22 is environmentally more acceptable, it has a higher index of compression than, for example, refrigerant 12. This means that compressor discharge temperatures become excessive at pressure ratios which would not cause excessive discharge temperatures if refrigerant 12 were being used.

Refrigerant R125 ($CHF_2CF_3$) has no ozone depleting potential. However, it is only now becoming commercially available and is very expensive to use alone.

Propane (R290) has certain useful thermodynamic properties and its use as a refrigerant has been proposed. U.S. Pat. No. 2,511,993 discloses the use of an azeotropic mixture of propane (32% by weight) and R22 as a refrigerant. However, propane by itself or in azeotropic mixtures has the significant disadvantage of forming inflammable mixtures with air, which poses a safety hazard in the event of leakage of refrigerant.

Japanese Patent Specification 63-105088 discloses mixtures of propane with R22 and R143A ($CF_3CH_3$) which would be flammable.

The assessment of flammability characteristics is not necessarily predictable, depending on a variety of factors including the nature of the CFC and its effect on the combustion process.

It is an object of the present invention to provide non-flammable mixtures of propane with CFC refrigerants in suitable proportions such as to impart the required overall refrigerant characteristics for use in a vapour compression refrigerators (such as pressure/temperature relationship, specific heat ratio, latent heat of vapourisation, compression ratio, acoustic velocity, vapour density, heat transfer properties, and water and oil solubility properties) whilst at the same time being of improved environmental acceptability, and at reasonable cost.

A first aspect of the invention provides a non-flammable refrigerant composition for use in a refrigerant apparatus which comprises a mixture of three different components:
(i) a major portion comprised of a refrigerant selected from chlorodifluoromethane (R22) and pentafluoroethane (R125);
(ii) a refrigerant selected from pentafluoroethane (R125) and octafluoropropane (R218); and
(iii) propane
in non-flammable proportions.

A second aspect provides a method of refrigeration which employs the composition as refrigerant medium.

A third aspect provides a refrigeration apparatus which employs the composition as refrigerant medium.

The gases are used in proportions which constitute a non-flammable mixture. Such mixture may or may not constitute an azeotropic mixture (i.e. a constant boiling mixture).

The effect of the propane is to reduce the index of compression of the composition. The presence of relatively large proportions of the CFC components R22, R125 and R218 renders the composition non-flammable. In this way, the disadvantages of the various CFC'S and the flammability of propane are avoided. In particular, the composition provides a non-toxic, non-flammable refrigerant with low index of compression, good miscibility with lubricating oil and good motor cooling characteristics.

The composition is non-flammable so that in the event of a leak of refrigerant medium into the atmosphere, no explosive or flammable mixture is produced. In particular, a non-flammable composition is one which contains the gases in such a ratio that when the composition is mixed with air in practical proportions (e.g. in the event of a leak) no flammable mixture results.

Overall, the proportions of the components are preferably in the following proportions by weight:
(i) 65-90 wt%
(ii) 5-25 wt%
(iii) 3-15 wt%
such that the composition is non-flammable.

Compositions comprising R22, R125 and propane are preferably in the following proportions:
(i) 65-75 wt% of R22;
(ii) 15-25 wt% of R125; and
(iii) 5-15 wt% of propane.

Compositions comprising R22, R218 and propane are preferably in the following proportions:
(i) 83-93 wt% of R22;
(ii) 3-9 wt% of R218; and
(iii) 3-9 wt% of propane.

Compositions comprising R125, R218 and propane are generally in the following proportions:
(i) 80-90 wt% of R125;
(ii) 5-15 wt% of R218; and
(iii) 3-10 wt% of propane.

The refrigerant compositions of the present invention can be used to replace presently used refrigerants with little modification to the apparatus or operating parameters, and provide acceptable coefficients of performance.

Embodiments of the present invention will now be described in the following Examples.

FIGS. 1 to 7 show refrigerant performance data for Example 1, whilst

EXAMPLE 1

(Refrigerant Performance)

A refrigerant test rig was constructed with the object of testing various refrigerants and refrigerant mixtures under practical operating conditions. The test rig consisted of a continuous ice maker fed with refrigerant by an HP float type metering device. The refrigerant was compressed by a fully sealed compressor and condensed in a water cooled condenser. Provision was made for measuring the rate of ice production, the weight of condensing water flow, the compressor suction and discharge pressures and refrigerant temperatures and water temperatures at various points. Provision was also made for measuring the power consumption of the compressor and the compressor motor winding temperatures. The results are shown in FIGS. 1 to 7 wherein:

EXAMPLE 2

(Flammability Measurement)

Figure 1:
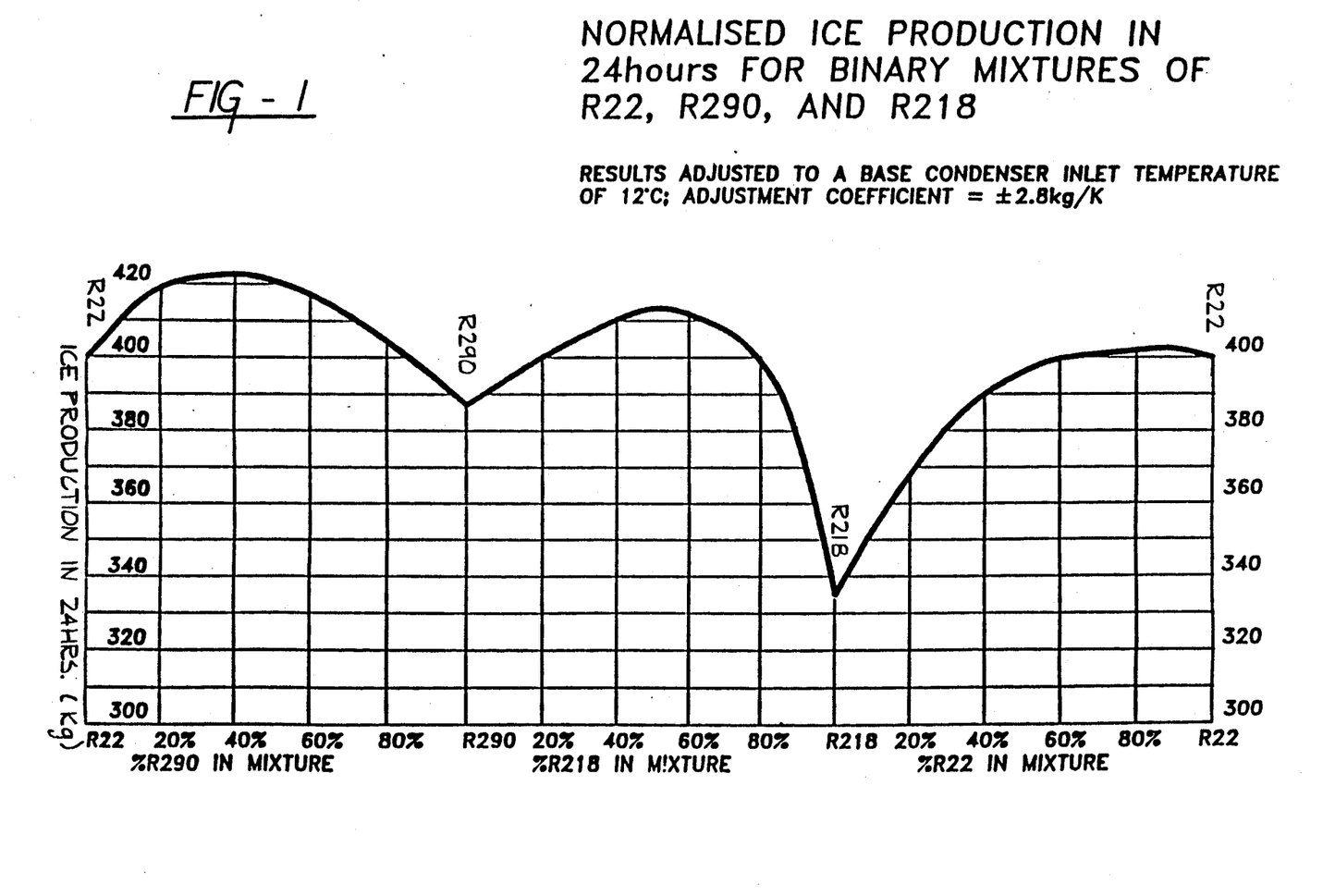
FIG. 1 shows the effect of varying the proportions of refrigerant 22, refrigerant 290 and refrigerant 218 in the three possible binary mixtures of these refrigerants.
Figure 2A:
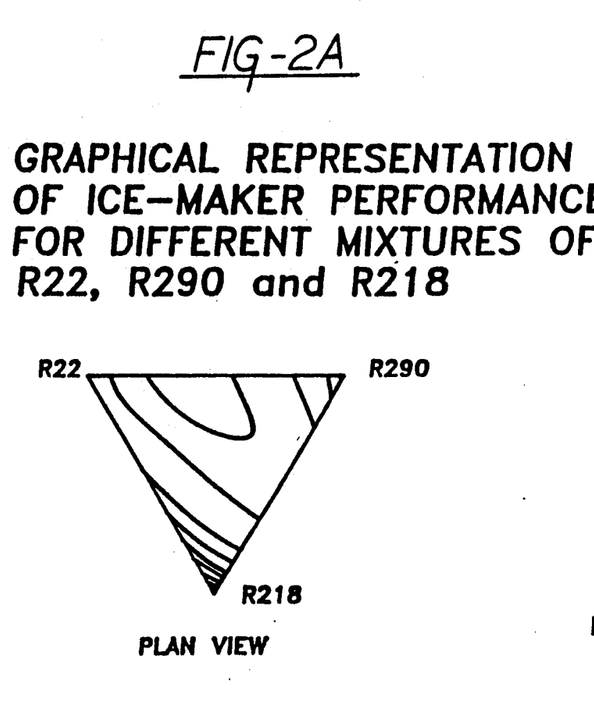
FIGS. 2A and 2B show a graphical representation of the surface produced when the three sectors of FIG. 1 are combined to form a triangular prism.
Figure 2B:
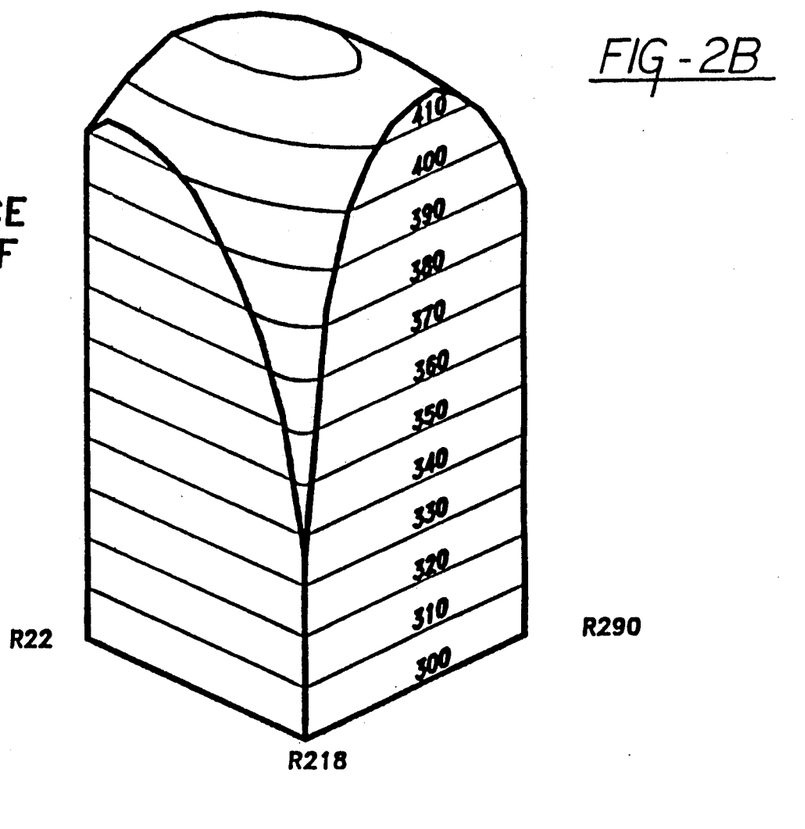
Figure 3:
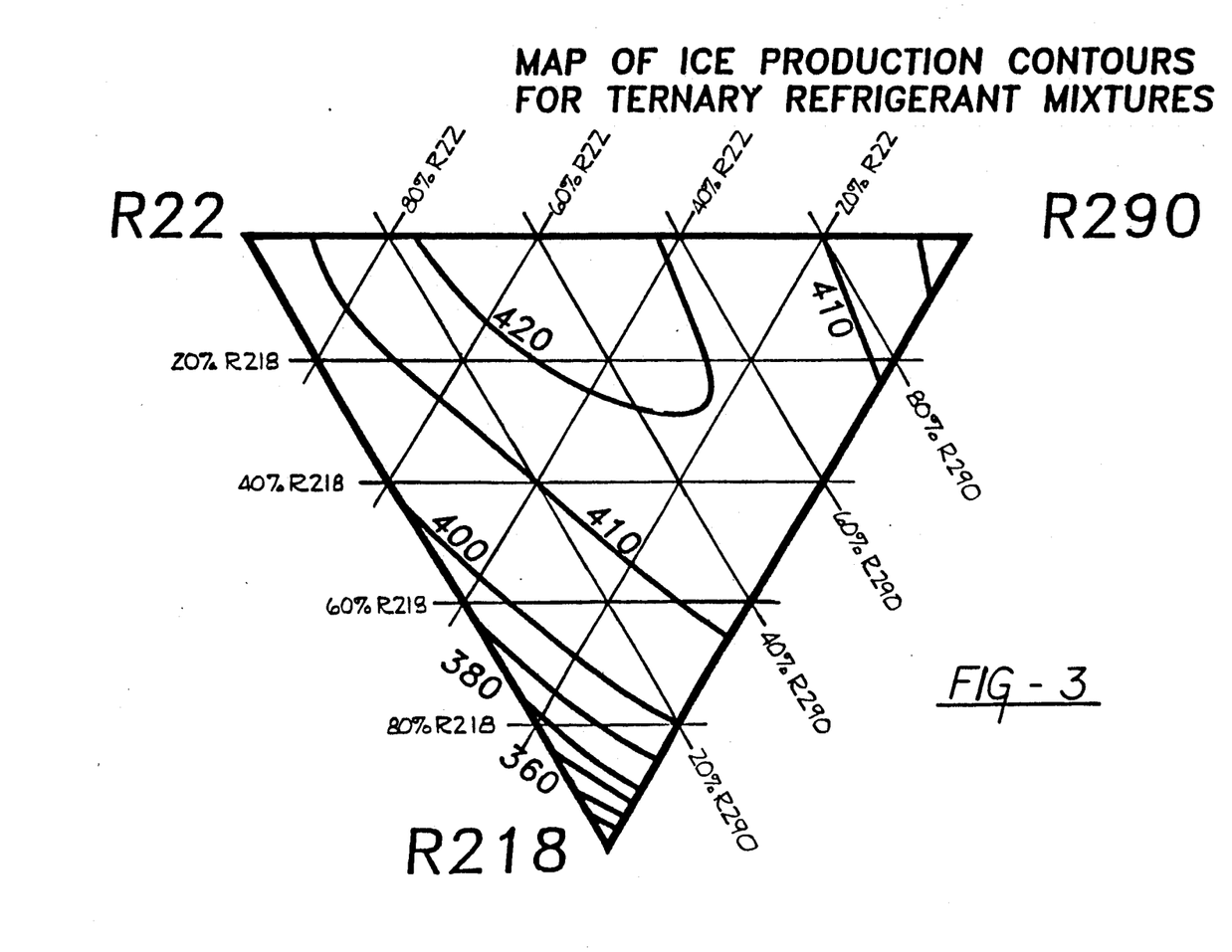
FIG. 3 is a plan view of the top of the prism showing ice production contours. Similar prisms can be constructed for compressor discharge temperatures and for motor winding temperatures.
Figure 4A:
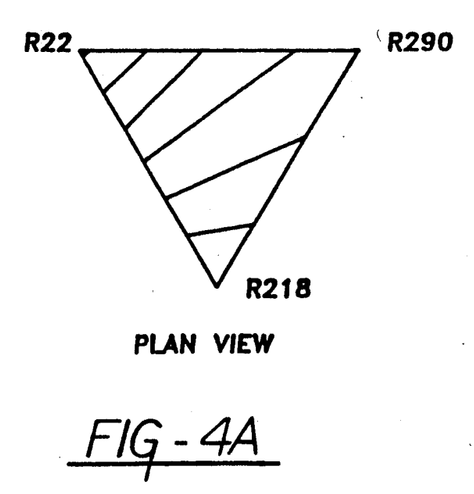
FIGS. 4A and 4B show the effect of various mixtures on compressor discharge temperature from which the beneficial effects of additions of R218 and R290 to a major component of R22 can be seen.
Figure 4B:
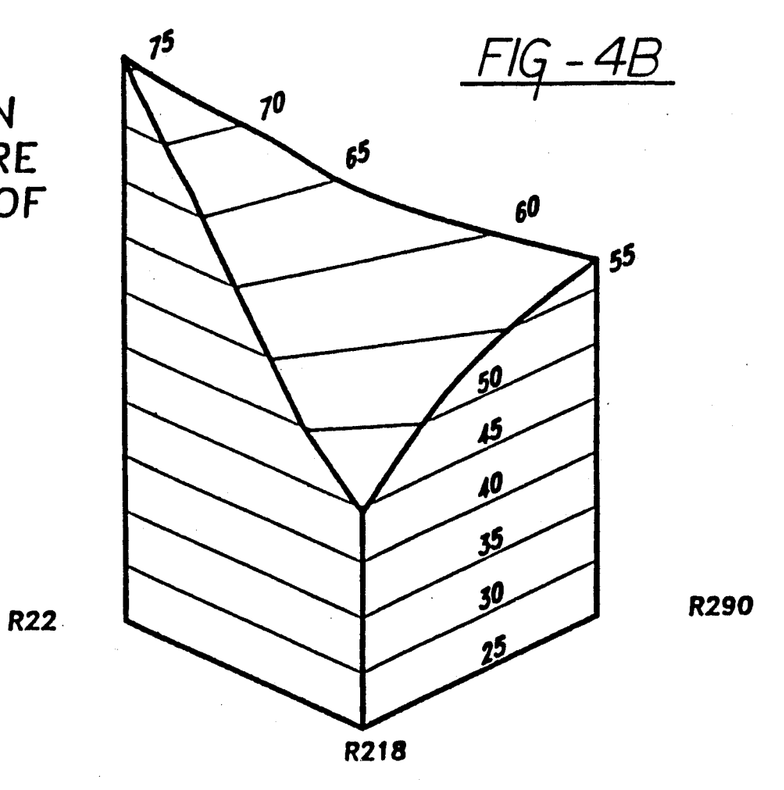
Figure 5:
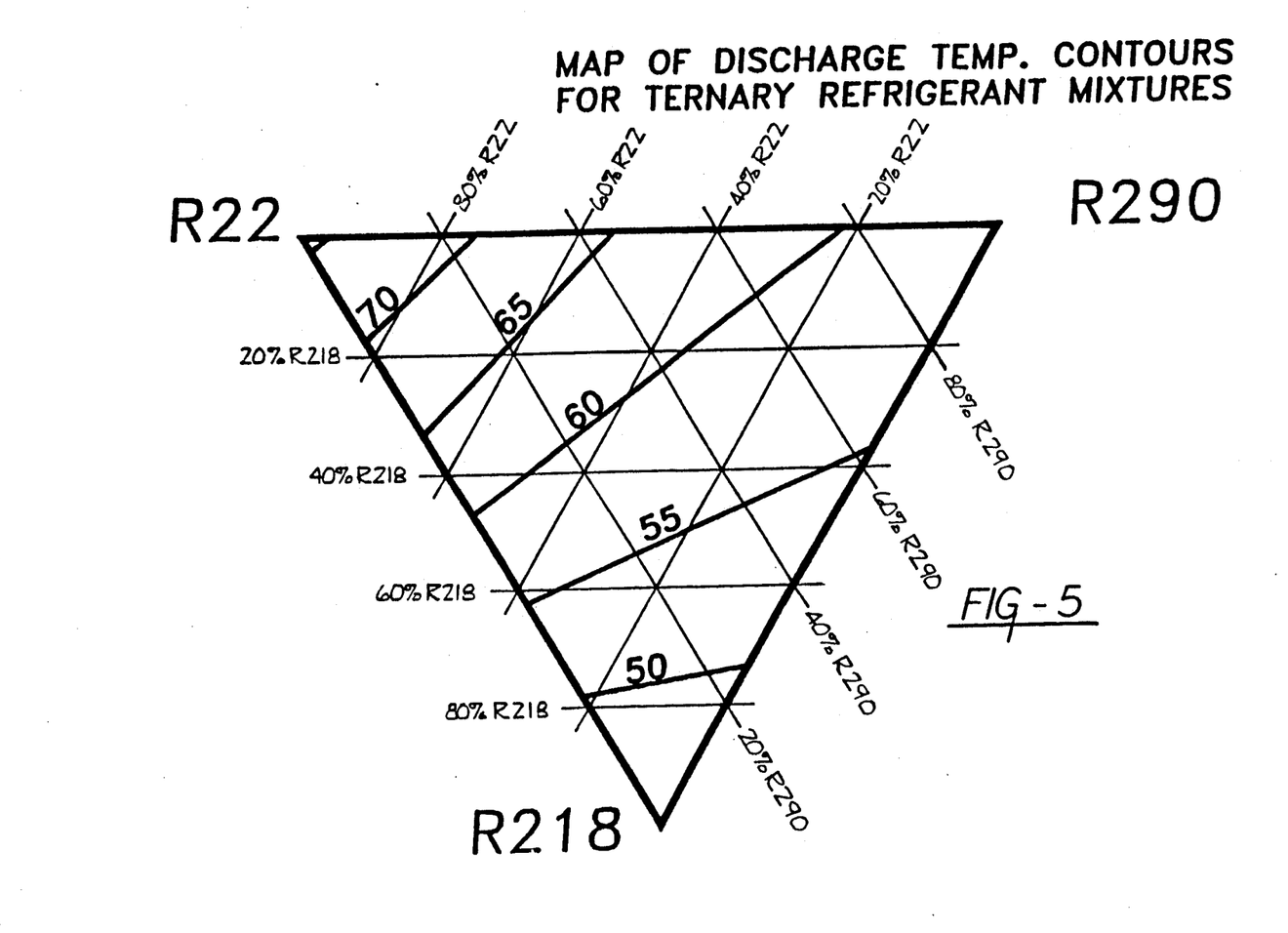
FIG. 5 is a plan view of the top surface of the prism showing discharge temperature contours for ternary refrigerant mixtures of R22, R290 and R218.
Figure 6A:
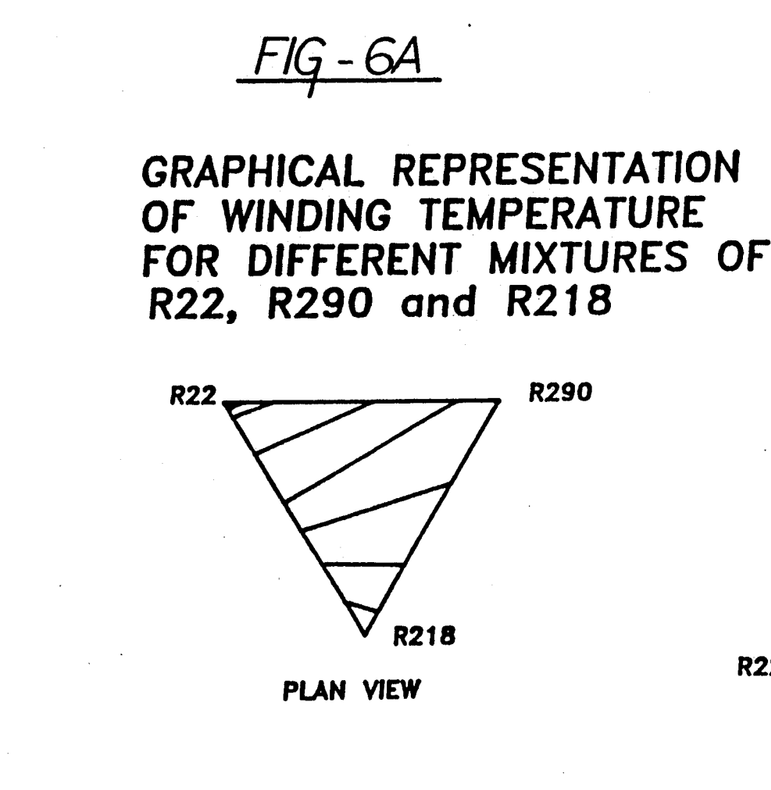
FIGS. 6A and 6B show a three dimensional view of the prism representing the effect of different refrigerant proportions in the refrigerant mixture used as an example on motor winding temperature. From this Figure it can be seen that small additions of R218 and R290 have a major effect on motor winding temperatures under the conditions of the test.
Figure 6B:
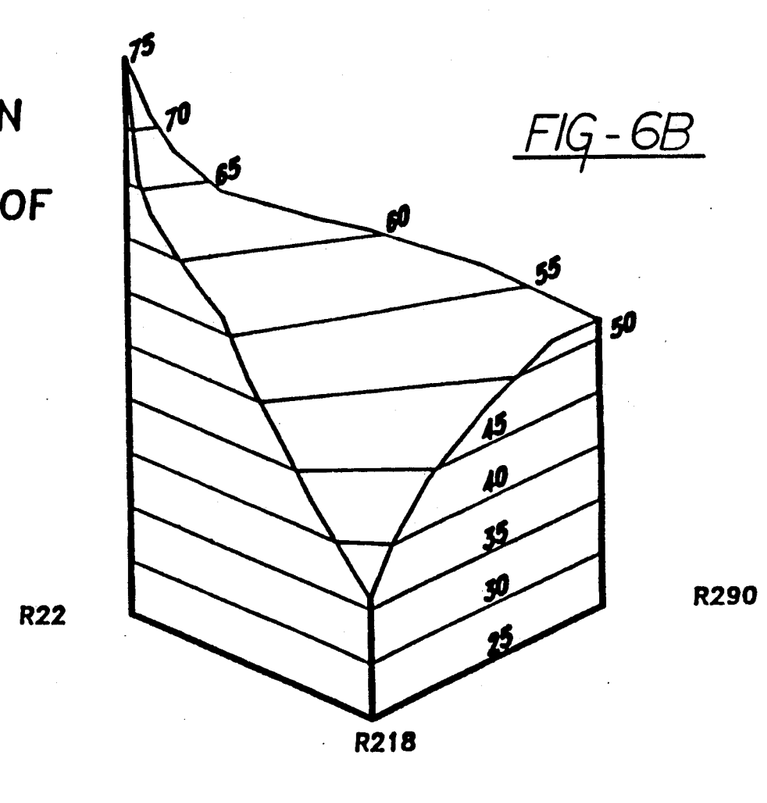
Figure 7:
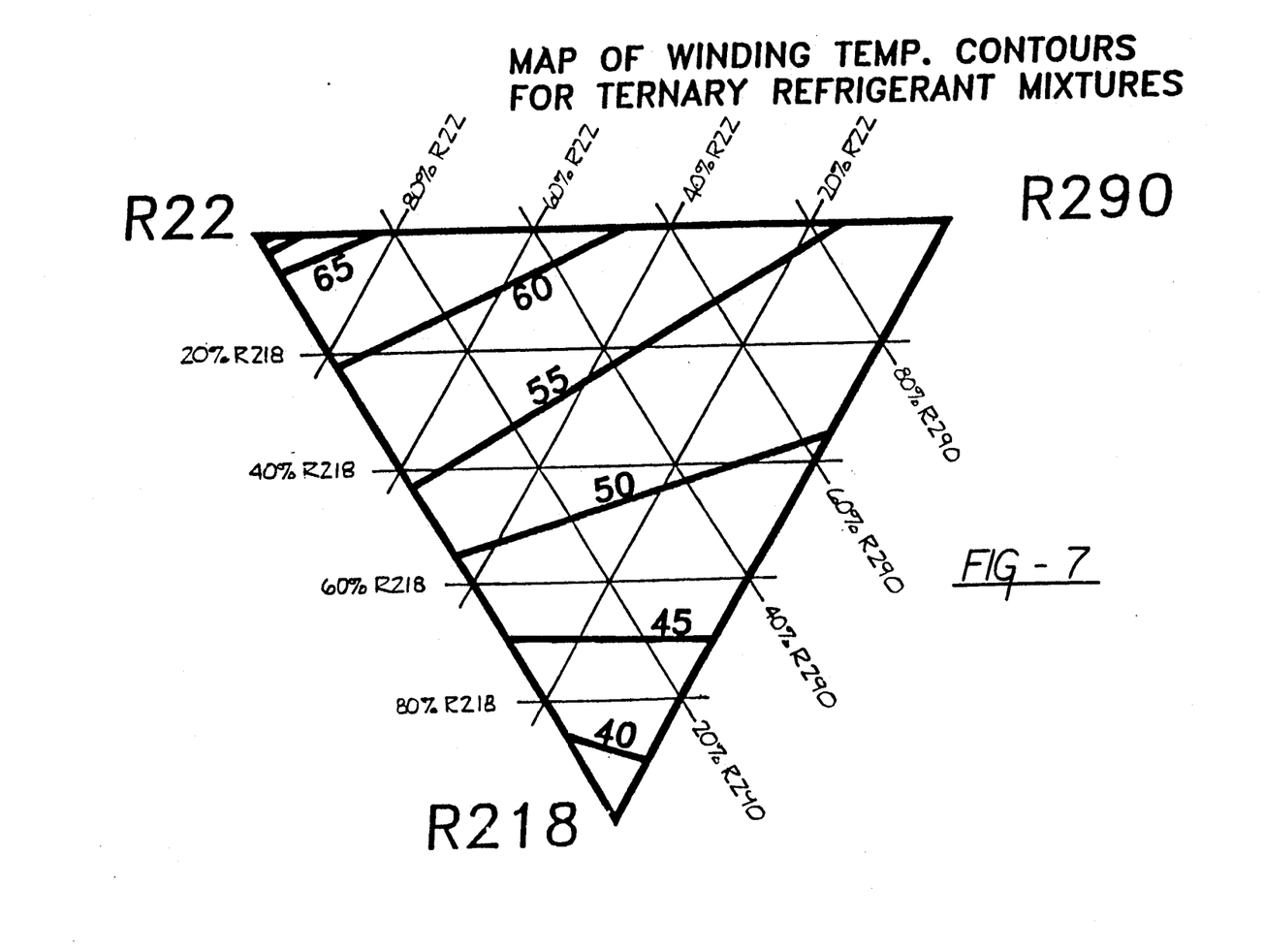
FIG. 7 is a plan view of the top surface of the prism showing winding temperature contours.
Figure 8:
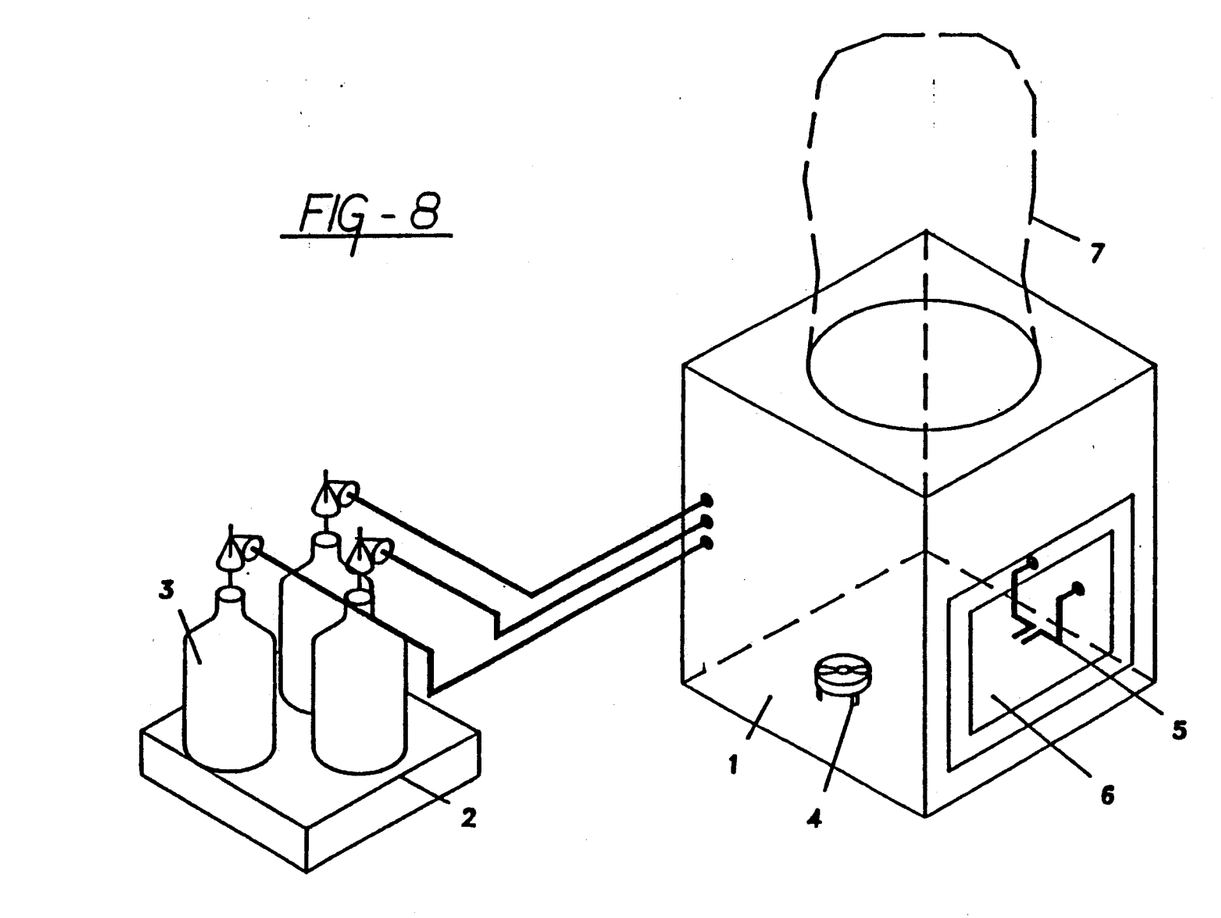
FIG. 8 shows a test apparatus used in the flammability testing described in Example 2.

It is an object of the present invention to mix the three components of the new refrigerant in proportions which are non-flammable. An apparatus was constructed to test the flammability of various refrigerant mixtures. The apparatus consisted of a metal box 1 (0.5 m$^3$) with three refrigerant connections attached to three refrigerant cylinders 3 located on electronic scales 2 weighing to 0.001 Kg, as indicated in FIG. 8. The metal box had rigid perspex windows on two sides and an aperture on the third side which could be covered with thin transparent plastics film 6. A hole was cut in the top of the box so that an inflatable plastic bag 7 could be sealed in place. The box contained a small fan 4 to ensure adequate mixing and a pair of electrodes 5 to provide a spark with which to ignite the mixture if possible. In order to make sure that there was enough energy in the spark to ignite the mixture if at all possible, an 11,000 volt transformer was used to provide the spark which was about 12 mm long. During flammability tests the refrigerants were added to the air in the box in predetermined proportions. At the start of the test the bag on top of the box was deflated. As refrigerant was added to the box the bag progressively inflated. The test was terminated before significant internal pressures, which might have caused significant leakage from the box, were developed. At each stage of an individual test the R22 was added first, the R218 next and the flammable propane last. After an interval of about 30 seconds to allow mixing within the apparatus, the spark was switched on for a few seconds. If ignition did not take place the concentration of the refrigerant mixture in the predetermined proportions was increased by adding more refrigerant to the air in the box till the bag was approaching full inflation. The results of these flammability tests were consistent and reproducible. Tests were also carried out on mixtures of pure propane in air. It was found that pure propane could be caused to ignite at proportions slightly less those given in the literature for the lower limit of flammability. It was considered that this was probably because the very high energy of the spark and because of the large dimensions of the test chamber which minimised cooling effects from the walls. Most reported flammability testing appears to have been done in relatively small vessels with low energy sparks. It was found for example that a mixture of 86% R22, 7% R218 and 7% R290 could be induced to ignite at high concentrations in air. A mixture of 88% R22, 6% R218 and 6% R290 could not be induced to ignite under any conditions up to concentrations of about 5 times the amount of R22 permitted as the result of an accident in a humanly occupied space.

The results of the tests in the refrigeration rig and the flammability test rig indicate that non-flammable refrigerant mixtures containing R218 and R290 can produce significant benefits in reduction of motor winding temperature, reduction in compressor discharge temperature and increase of refrigerating capacity.

I claim:

1. A non-flammable refrigerant composition for use in a refrigerant apparatus which comprises a mixture of three different components:

(i) 65 to 93 wt% chlorodifluoromethane (R22);

(ii) 3 to 15 wt% propane (R290); and (iii) the balance octafluoropropane (R218);

in non-flammable proportions.

2. A composition according to claim 1 which comprises:

(i) 83-93 wt% of R22;

(ii) 3-9 wt% of R218; and (iii) 3-9 wt% of propane.

3. A vapour compression refrigeration apparatus which employs as refrigerant medium a composition according to claim 1.

4. A method of performing vapour compression refrigeration comprising compressing and condensing a non-flammable refrigerant composition which comprises a mixture of three different components:

(i) 65 to 93 wt% chlorodifluoromethane (R22);

(ii) 3 to 15 wt% propane (R290); and (iii) the balance octafluoropropane (R218);

in non-flammable proportions.

* * * * *